(12) United States Patent
Tysowski

(10) Patent No.: US 8,185,521 B2
(45) Date of Patent: May 22, 2012

(54) SYSTEM AND METHOD FOR PRESENTATION OF LOCAL AND REMOTE MESSAGE SEARCH RESULTS

(75) Inventor: Piotr Konrad Tysowski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 367 days.

(21) Appl. No.: 12/039,842

(22) Filed: Feb. 29, 2008

(65) Prior Publication Data

US 2009/0222402 A1    Sep. 3, 2009

(51) Int. Cl.
*G06F 7/00* (2006.01)
*G06F 17/30* (2006.01)

(52) U.S. Cl. ...................................................... 707/722
(58) Field of Classification Search .................... 707/616
See application file for complete search history.

(56) References Cited

U.S. PATENT DOCUMENTS

| | | | |
|---|---|---|---|
| 5,764,899 A * | 6/1998 | Eggleston et al. | 709/203 |
| 5,909,689 A * | 6/1999 | Van Ryzin | 1/1 |
| 7,024,457 B1 | 4/2006 | Newman et al. | |
| 7,130,841 B1 | 10/2006 | Goel et al. | |
| 2005/0038775 A1 | 2/2005 | Haveliwala et al. | |
| 2005/0149500 A1 | 7/2005 | Marmaros et al. | |

OTHER PUBLICATIONS

"duplicate." Merriam-Webster Online Dictionary. 2010.Merriam-Webster Online. Jun. 17, 2010 <http://www.merriam-webster.com/dictionary/duplicate>.*
Resnick P. et al: "Internet Message Format; rfc2822.txt", IETF Standard, Internet Engineering Task Force, IETF, CH, Apr. 1, 2001, XP015008605.
Office Action dated Feb. 22, 2011, issued in corresponding European Patent Application No. 08152121.3.

* cited by examiner

*Primary Examiner* — Pierre Vital
*Assistant Examiner* — Jason Liao
(74) *Attorney, Agent, or Firm* — Geoffrey deKleine; Borden Ladner Gervais LLP

(57) ABSTRACT

There is disclosed a system and method for presenting message search results at a wireless handheld device. In an embodiment, the method comprises conducting a search of local messages stored in the wireless handheld device using at least one search term to obtain a local search result; retrieving a search of remote messages stored in a message server using the at least one search term to obtain a remote search result; comparing the local and remote search results to identify any duplicate messages; and if the size of the local message is greater than or equal to the size of the remote message, then selecting the local message for presentation; else selecting the remote message for presentation.

17 Claims, 7 Drawing Sheets

451

Folder: Server Archive
Message Status: Opened
To: Fred
From: Robert
Sent: Jan 28, 2008 3:26 PM
Subject: Meeting on Monday Fred, Let's set up a meeting for early next week to discuss the new LASER project. We should confirm by tomorrow when and where the meeting will be. Here are the things we need to cover at the meeting:

1. Project Team Members
2. Budget
3. Schedule
4. Implementation
5. Testing
6. Go Live At the moment, the project team members will comprise:

Robert, Project Manager
Fred, Engineering
Jenny, Finance
Tom, Manufacturing
Brad, Sales We will also need to prepare some further details regarding the proposed.

If you have any items to add to the meeting agenda, please let me know. Thanks.

Best,

Robert

FIG. 4E  —400E

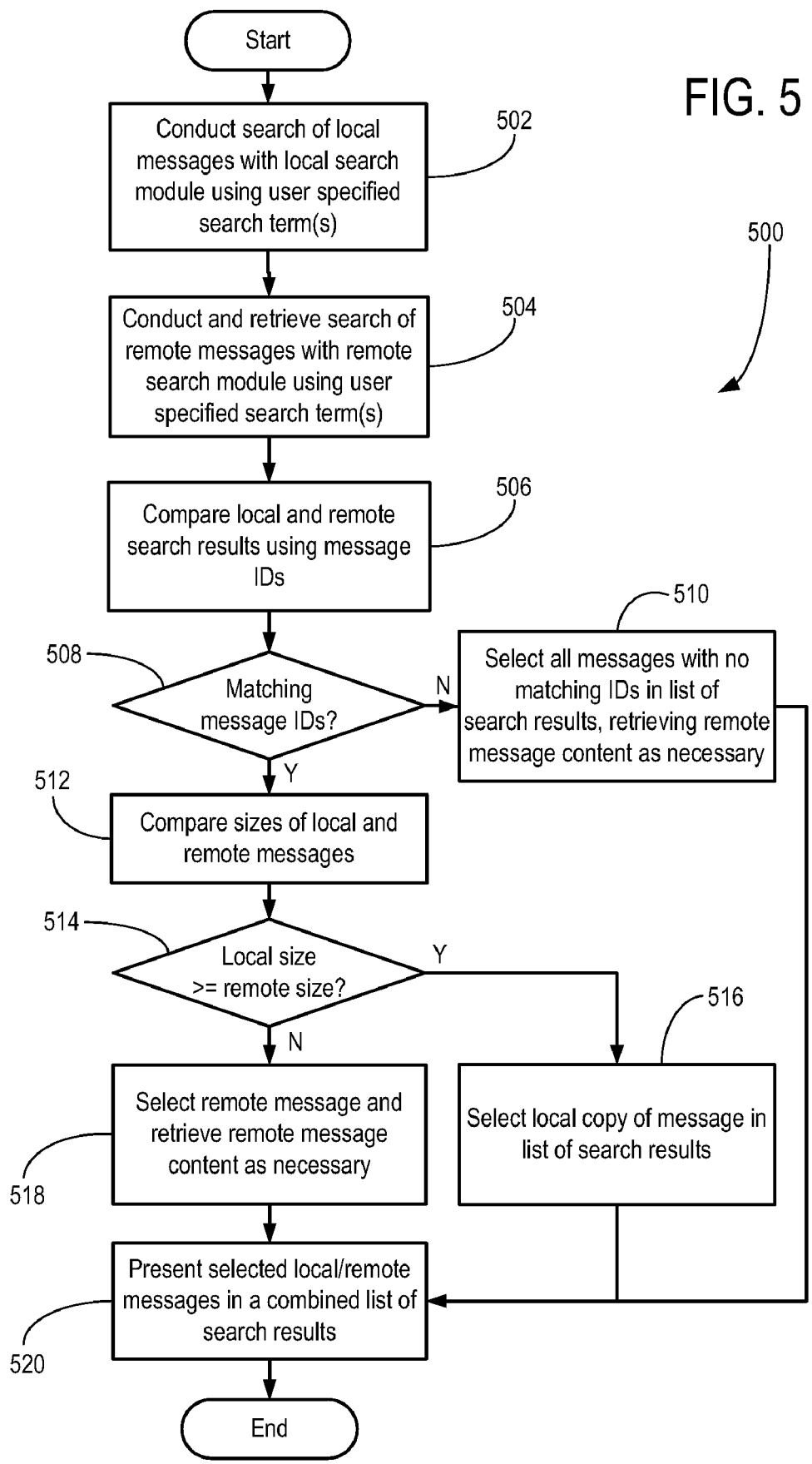

SYSTEM AND METHOD FOR PRESENTATION OF LOCAL AND REMOTE MESSAGE SEARCH RESULTS

FIELD OF THE INVENTION

The present disclosure relates generally to systems and methods for presenting message search results.

BACKGROUND

Currently, when a user performs a search for electronic mail (email) messages, the search is usually limited to messages locally stored on the user's communication device. The extension of search capability to support searches of remotely stored messages has been proposed, but searching a remote message server as well as locally stored messages poses special problems.

BRIEF DESCRIPTION OF THE DRAWINGS

In the figures which illustrate exemplary embodiments:

FIG. 4E is an illustrative example of a message located by a remote message search in accordance with an embodiment.

FIG. 5 shows a schematic flowchart of a method in accordance with an embodiment.

DETAILED DESCRIPTION

As noted above, the present disclosure relates generally to a system and method for presentation of message search results.

Figure 1:
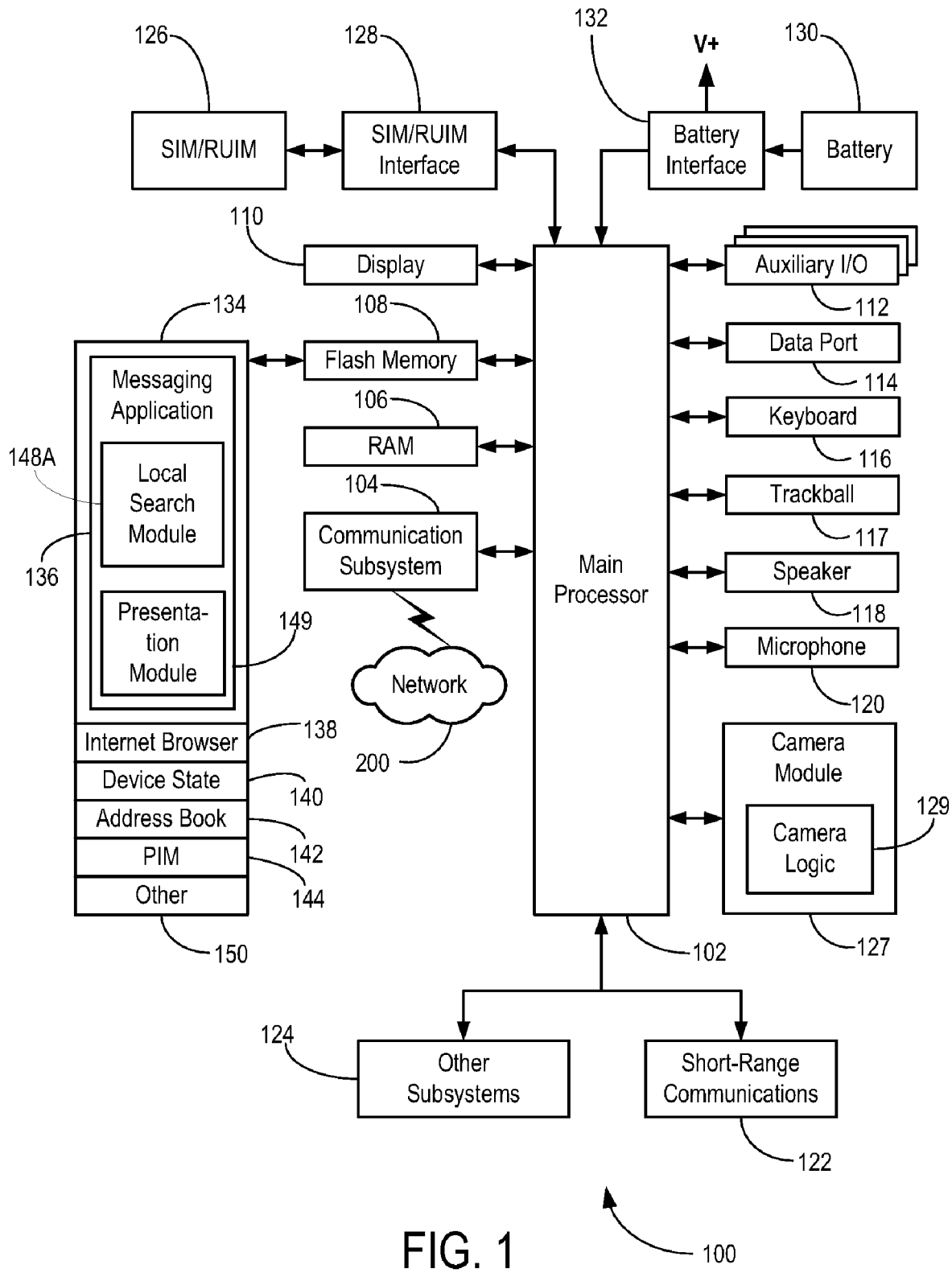
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications subsystem 122, a subscriber identity module (SIM)/removable user identify module (RUIM) 126 with a corresponding SIM/RUIM interface 128, a camera module 127, associated camera logic 129, and other subsystems 124.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item. Other subsystems may be used for navigation, including without limitation a click-wheel and a touch-sensitive interface such as, for example, a touch-screen or touchpad.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100.

The main processor 102, in addition to its operating system functions, enables execution of various software applications 134 on the communication device 100. A subset of software applications 134 that control basic device operations, including data and voice communication applications, will normally be installed on the communication device 100 during its manufacture. In some embodiments, the communication device 100 may be solar powered.

The software applications 134 may include a messaging application 136. The messaging application 136 can be any suitable software program that allows a subscriber or user of the communication device 100 to send and receive wireless text communications. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with. In an embodiment, the messaging application 136 may include a local search module 148A for searching messages (and communicating with remote search modules as may be required), and a presentation module 149 for presenting in a message list the results of the local search module 148A. Each of these modules will be described in more detail further below.

The communication device 100 may further include a device state module 140, an address book 142, a personal information manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystems 124.

Figure 2:
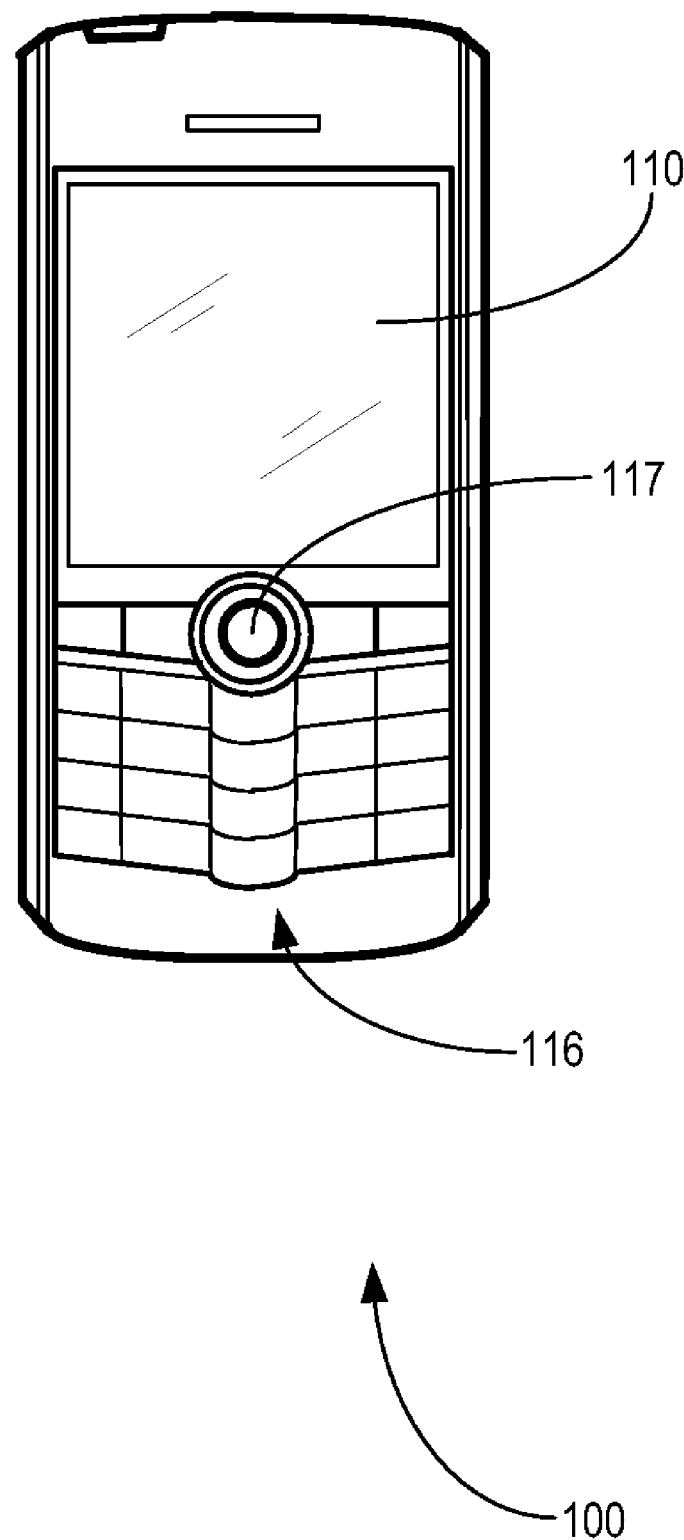
FIG. 2 is an illustrative example of a handheld mobile communication device which may provide an operating environment.

Now referring to FIG. 2, shown is an illustrative front view of a handheld mobile communication device 100 that may provide a suitable operating environment. As shown, the communication device 100 may include display 110, keyboard 116, and other input or navigation means such as trackball 117. The display 110 may be configured to display various screens allowing the user of device 100 to view screen outputs from the various software applications 134, including the presentation module 149. Display 110 may also be configured to provide a touch-sensitive screen input in response to a prompt or query displayed on display 110.

Figure 3:
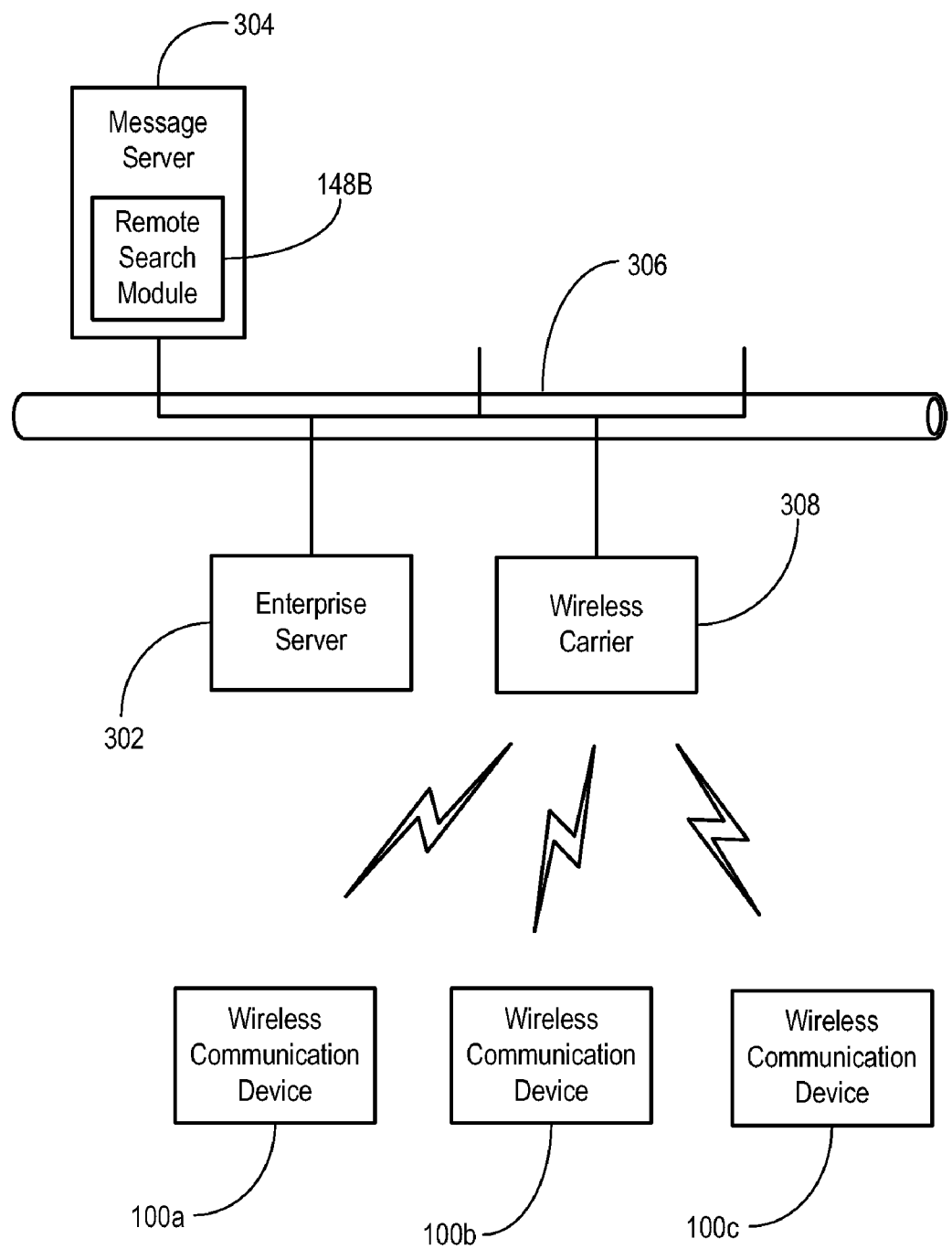
FIG. 3 is a schematic block diagram of an illustrative network which may provide a suitable operating environment.

Now referring to FIG. 3, shown is a schematic block diagram of an illustrative network 300 that may provide a suitable operating environment. As shown, network 300 includes an enterprise server 302 that may be configured to manage various communications applications including an email messaging application for a plurality of users. Enterprise server 302 may be connected via a local area network (LAN) or wide area network (WAN) 306 to a wireless carrier 308 configured to wirelessly transmit data to and receive data from a plurality of wireless communication devices 100a, 100b, 100c operated by various users. Enterprise server 302 may also be connected to a message server 304 configured to manage all inbound and outbound messages as seen by users on their communication devices 100a-100c.

Each of the communication devices 100a-100c of FIG. 3 may store messages locally, for example within flash memory 108. These locally stored messages may be managed by the users of communication devices 100a-100c using messaging application 134. For the purposes of the present discussion, the messages stored locally in the communication device 100 in flash memory 108 will be referred to as "locally stored" messages, and messages stored in the message server 304 will be referred to as "remotely stored" messages.

Figure 4A:
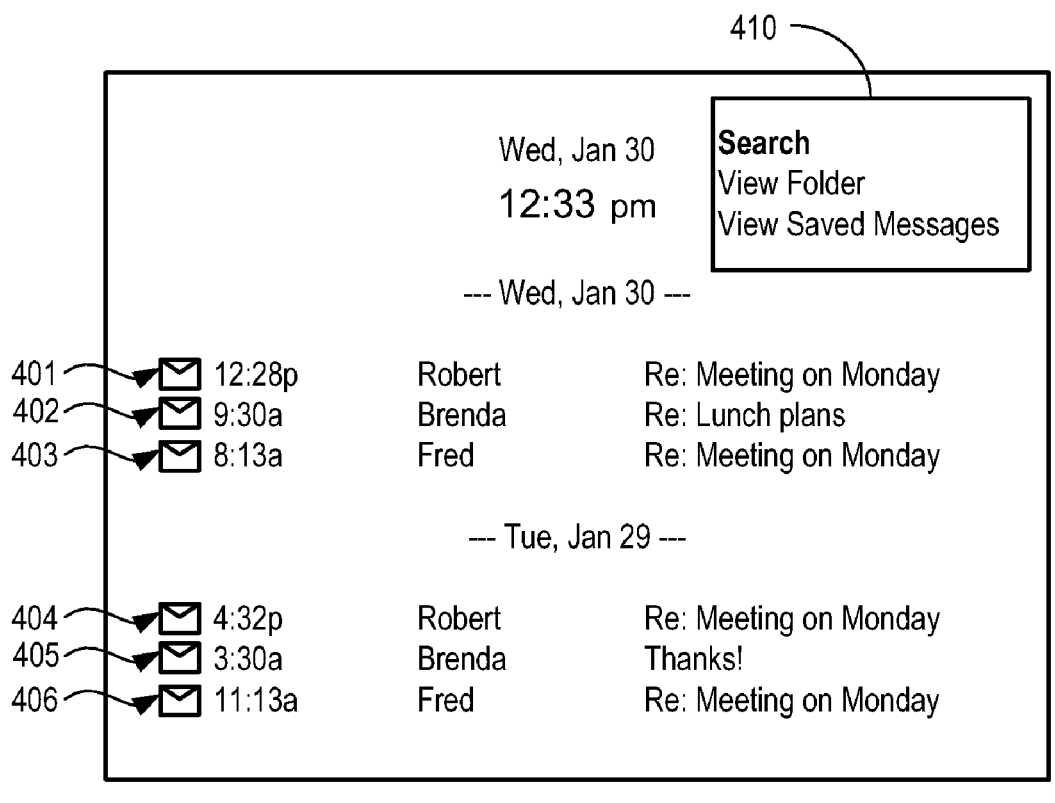
FIG. 4A is an illustrative message list user interface and menu options in accordance with an embodiment.

As mentioned above, the messaging application 136 may include a local search module 148A that may be configured to allow a user to search the locally stored messages using user supplied search terms. FIG. 4A provides an illustrative example of a message list user interface 400A listing a number of messages 401-406. A scroll-down or pop-up menu 410 may be presented for the user to select a "search" menu option to search the messages using user specified search terms.

Figure 4B:
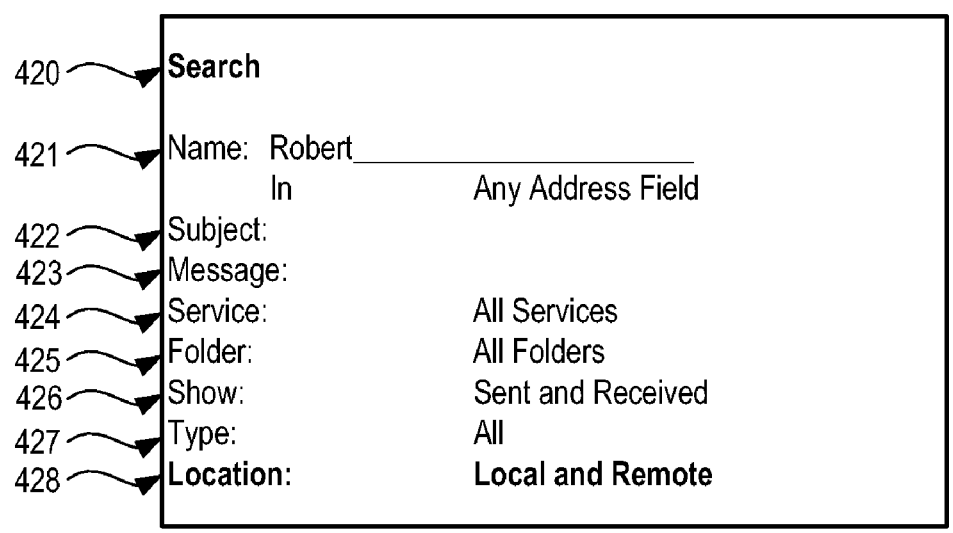
FIG. 4B is an illustrative search user interface in accordance with an embodiment.

FIG. 4B shows an illustrative search user interface 400B with a number of input fields for inputting relevant search terms. As shown, search terms may be entered for specific fields, such as the search term "Robert" in the name field 421. Other fields may be available to search including a subject field 422, a message body field 423, etc. The search user interface 400B may also allow a user to select various search options by specifying, for example, the type of service 424, the folders 425, whether both sent and received messages are to be searched 426, the type of message (e.g. email, email with attachment, PIN, SMS, MMS, phone call message, voice mail message, etc.) 427 to search, and whether remote locations 428 (remote email folders in the message server 304) are to be searched in addition to local email folders in the local flash memory 108.

As the communication device 100 may have limited space available locally in flash memory 108, from time-to-time messages may be deleted from local flash memory 108 by memory management cleanup in order to free up space for storing new messages. Therefore, a message may no longer be accessible locally from flash memory 108. In this case, with a message server 304 that typically allocates more space for storage, the user may search for and retrieve a copy of the message that may be remaining on message server 304.

A suitable means for remotely searching the messages stored in the message server 304 is desirable. Thus, as shown in FIG. 3, a remote search module 148B may be provided at the message server 304, and the remote search module 148B may be configured to co-operate with the local search module 148A provided on the communication devices 100a-100c. In an embodiment, the remote search module 148B may be configured to conduct a search of the remotely stored messages using the search terms as provided by the user of a communication device 100a-100c. If the user has specified a search of both locally stored and remotely stored messages, as shown by illustration at 428 of FIG. 4B, then local search module 148A and remote search module 148B may co-operate to obtain a combined list of results from the locally stored and remotely stored messages.

In an embodiment, the messaging application 134 may include a presentation module 149 configured to merge the local and remote search results obtained by local search module 148A and remote search module 148B, and to present the combined search results in a list. An illustrative example is shown in screen 400C of FIG. 4C, in which messages 401, 404, 431 are listed as they contain the search term "Robert", as entered in the name field 421 in FIG. 4B above.

In an embodiment, messages identified by the remote search module 148B may be distinguished from local search results using an appropriate notation, symbol, icon or some other distinguishing means. For example, message 431 located by remote search module 148B on the message server 304 may be identified using a remote message identifier 432 (such as using a graphic "server" icon for example). As well, in another embodiment, there may be two separate windowpanes, one to contain the local search results and the other to contain the remote search results, and the user may be provided with controls to navigate between them.

Figure 4C:
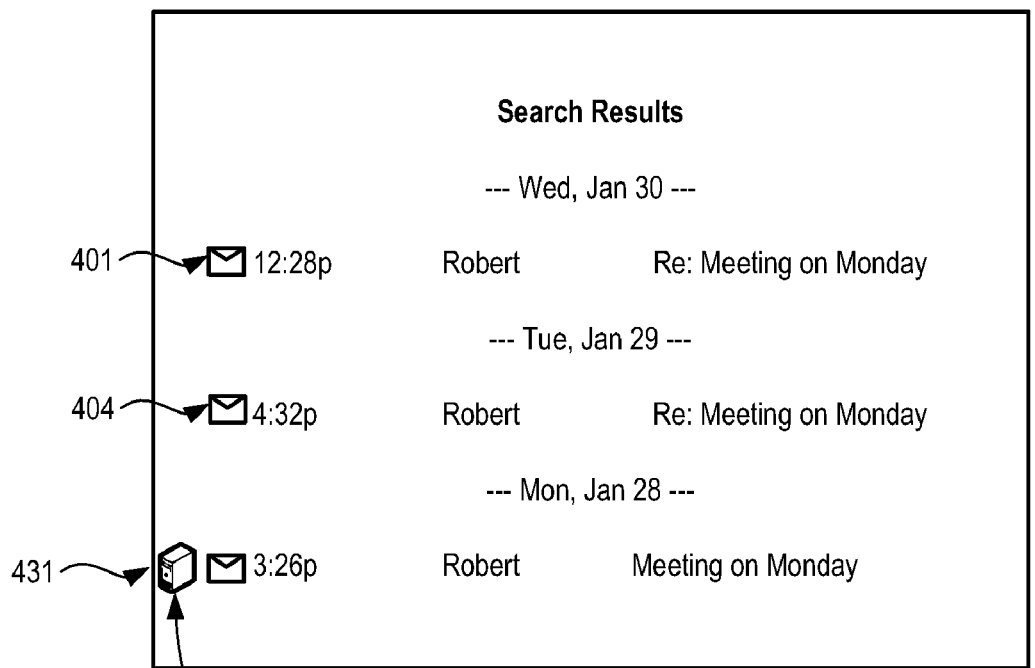
FIG. 4C is an illustrative list of search results in accordance with an embodiment.
Figure 4D:
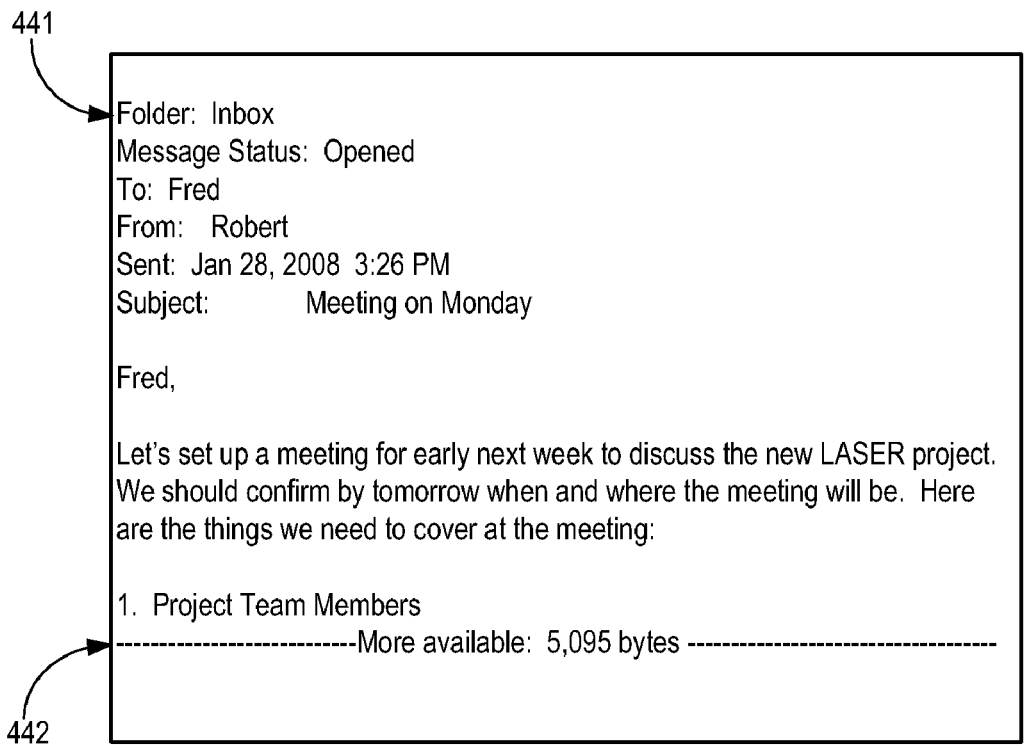
FIG. 4D is an illustrative example of a duplicate message located by a local message search in accordance with an embodiment.

In an embodiment, as shown in FIG. 4D, in order to save wireless communication bandwidth and storage space on communication device 100, a locally stored message may contain only the header information, such as the date, time, sender, recipient and subject, and a few lines from the message. A status line such as illustrated at 442 may indicate that more of the message is available for download, and if the user wishes to review the entire message, the user may then be provided with an option to retrieve more of the message by selecting "More" from a pop-up menu option (not shown), or simply by scrolling to the bottom of the message and continuing to scroll downwards using a scroll wheel (not shown), or by using the trackball 117, for example.

As noted earlier, message server 304 typically has a significantly larger storage space, and the corresponding message as stored in message server 304 may not have any such bandwidth or storage size restrictions. Therefore the entire message may be stored on the message server 304, as illustrated by example in screen 400E of FIG. 4E. Also, the location of this message may be indicated in a "Folder" field, which indicates the folder from which the message was retrieved.

In an embodiment, it may be possible that local search module 148A and remote search module 148B may find duplicate messages (e.g. a copy is locally stored in flash memory 108, and also archived in message server 304). To identify whether or not two messages are duplicates, the local and remote search modules 140A, 148B may be configured to read a message identification number ("message ID") assigned to each message. The unique message ID may be managed by enterprise server 302, and may comprise a combination of some unique data such as a date/time stamp, the sender/receiver, and other unique information that may be stored in the message header.

In an embodiment, the message server 304 may assign a message ID when a message is sent or received. The message ID may be sequentially or randomly generated, and may be stored with each message in the message server 304. When an email is transmitted to a communication device 100a-100c, the corresponding message ID may be sent along with the email message, and may be stored in the communication device 100a-100c as well.

In an embodiment, the local and remote search results may be searched on the communication device 100a-100c for duplicate messages by comparing the message IDs. In this case, the remote search results presented on the device 100a-100c may be limited to only the header information, including the message ID and the total size of the message as stored on the message server 304. If there are duplicate messages located in a local and remote search (i.e. both local and remote copies have the same message ID), presentation module 149 may be configured to display the duplicate messages according to the user's selected preferences. For example, in an embodiment, a user may prefer to see both local and remote messages in the search results, even though they are duplicate messages. In this case, the remote copy of the message may be retrieved to the device 100a-100c based on the message ID in the header. In another embodiment, the user may specify that only the locally stored copy of the message be listed in the search results. In this case, the remote copy of the message need not be retrieved.

In yet another embodiment, if there are duplicate messages listed in the search results, the presentation module 149 may be configured to compare the size of the local copy of the message to the remote copy of the message (e.g. based on total file size information that may be available in the header of the remote copy search result) before determining which copy to present in the list of search results.

For example, if the message as shown in FIG. 4D and FIG. 4E have been located by the local search module 148A and the remote search module 148B respectively, then the presentation module 149 may be configured to compare the size of the local message to the size of the remote message. If the local and remote messages are substantially the same size, the presentation module 149 may conclude that the local copy of the message is complete and present this copy in the list of search results. In this illustrative example, the message shown in FIG. 4D is smaller than the size of the remote message shown in FIG. 4E, and therefore the presentation module may conclude that the remote copy of the message found on message server 304 should be presented in the list of search results. As illustratively shown by message 431 in FIG. 4C, the location of the message may be indicated by a graphic server icon 432 as previously described.

In an embodiment, if a search is performed using a search term that may be contained anywhere in the message, and if the locally stored copy of the message is not complete, then it is possible that the local search module 148A may not locate the search term in a message, while the remote search module 148B may find the search term in the full version of the message on the message server 304. In this case, even if the local and remote copies of the messages are identified as duplicates based on their message IDs, the remote server version of the message would be retrieved based on the comparison of their relative sizes.

Now referring to FIG. 5, shown is a schematic flowchart of an illustrative method 500 in accordance with an embodiment. As shown, method 500 begins and at block 502 conducts a search of local (e.g. messages locally stored in flash memory 108) messages with a local search module (e.g. local search module 148A) using one or more user supplied search terms (e.g. as illustrated in FIG. 4B). Method 500 then proceeds to block 504 where method 500 may conduct a search of remote (e.g. messages remotely stored in message server 304) messages with a remote search module (e.g. remote search module 148B). It will be appreciated that these searches may be performed in sequence in either order, or simultaneously.

Method 500 may then proceed to block 506, where the local and remote search results may be compared using the message IDs to determine if there are any duplicate messages (i.e. copies of the same message having the same message IDs, as illustrated in FIG. 4D and FIG. 4E).

Method 500 may then proceed to decision block 508, where method 500 may determine if there are any matching message IDs (i.e. duplicate messages) in the local and remote search results. If no, method 500 may proceed to block 510, where all messages with no matching message IDs are selected for presentation. If the message with no matching message ID is a remote message, the content of the remote message may be retrieved as necessary. Method 500 then proceeds to block 520, where the selected messages are presented in a list of search results (e.g. as illustrated in FIG. 4C).

At decision block 508, if there are matching message IDs, then method 500 may proceed to block 512, where method 500 may compare the sizes of the local and remote messages. Method 500 may then proceed to decision block 514, where method 500 determines if the size of the local message is equal to or larger than the size of the remote message. If yes, method 500 may proceed to block 516, where the local message is selected for presentation in the list of search results, as the local message appears to be complete, or more complete than the remote message. Method 500 may then proceed to block 520, where method 500 may present the selected local and/or remote messages in the list of search results for selection and review by the user.

At decision block 514, if the answer is no, method 500 may proceed to block 518, where the remote message is selected for presentation in the list of search results, and the content of the remote message is retrieved as necessary. Method 500 may then proceed to block 520, where the selected local and/or remote messages in the list of search results for selection and review by the user.

Thus, in an aspect, there is provided a method of presenting message search results at a wireless handheld device, the method comprising: conducting a search of local messages stored in the wireless handheld device using at least one search term to obtain a local search result; initiating and retrieving a search of remote messages stored in a message server using the at least one search term to obtain a remote search result; comparing the local and remote search results to identify any duplicate messages; and if the size of the local message is greater than or equal to the size of the remote message, then selecting the local message for presentation; else selecting the remote message for presentation.

In an embodiment, the method further comprises presenting the selected local or remote messages in a combined list of search results.

In another embodiment, the method further comprises identifying remote messages in the combined list of search results using a remote message identifier.

In another embodiment, the method further comprises presenting the selected local or remote messages in separate lists of search results.

In another embodiment, the method further comprises identifying duplicate messages in the local and remote search results by comparing message identification numbers.

In another embodiment, the method further comprises conducting the local and remote searches in any sequence, or concurrently.

In another embodiment, the method further comprises comparing content of the duplicate messages; and if the remote message selected for presentation, displaying available content from the local message, and retrieving content from the remote message for display as necessary.

In another aspect, there is provided a system for presenting message search results at a wireless handheld device, the system comprising: a local search module adapted to conduct a search of local messages stored in the wireless handheld device using at least one search term to obtain a local search result; a processor adapted to initiate and retrieve a search of remote messages conducted by a remote search module using the at least one search term to obtain a remote search result; a presentation module adapted to compare the local and remote search results to identify any duplicate messages; and the presentation module adapted to select the local message for presentation if the size of the local message is greater than or equal to the size of the remote message; else the presentation module is adapted to select the remote message for presentation and to retrieve message content from the remote message.

In an embodiment, the presentation module is adapted to present the selected local or remote messages in a combined list of search results.

In another embodiment, the system further comprises a processor adapted to identify remote messages in the combined list of search results using a remote message identifier.

In another embodiment, the presentation module is adapted to present the selected local or remote messages in separate lists of search results.

In another embodiment, the system further comprises a processor adapted to identify duplicate messages in the local and remote search results by comparing message identification numbers.

In another embodiment, the system further comprises a processor adapted to conduct the local and remote searches in any sequence, or concurrently.

In another embodiment, the system further comprises: a processor adapted to compare content of the duplicate messages; and if the remote message is selected for presentation, display available content from the local message, and retrieve content from the remote message for display as necessary.

In another aspect, there is provided a data processor readable medium storing data processor code that that when loaded into a wireless handheld device adapts the device to present message search results, the data processor readable medium comprising: code configured to conduct a search of local messages stored in the wireless handheld device using at least one search term to obtain a local search result; code configured to initiate and retrieve a search of remote messages stored in a message server using the at least one search term to obtain a remote search result; code configured to compare the local and remote search results to identify any duplicate messages; and if the size of the local message is greater than or equal to the size of the remote message, then selecting the local message for presentation; else selecting the remote message for presentation and retrieving message content from the remote message.

In an embodiment, the data processor readable medium further comprises code configured to present the selected local or remote messages in a combined list of search results.

In another embodiment, the data processor readable medium further comprises code configured to identify remote messages in the combined list of search results using a remote message identifier.

In another embodiment, the data processor readable medium further comprises code configured to present the selected local or remote messages in separate lists of search results.

In another embodiment, the data processor readable medium further comprises code configured to identify duplicate messages in the local and remote search results by comparing message identification numbers.

In another embodiment, the data processor readable medium further comprises code configured to conduct the local and remote searches in any sequence, or concurrently.

While illustrative embodiments have been described above, it will be appreciated that various changes and modifications may be made. More generally, the scope of the invention is defined by the following claims.

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

What is claimed is:

1. A method of presenting message search results at a wireless handheld device, the method comprising:
   conducting a search of local messages stored in the wireless handheld device using a search term to obtain ones of the local messages that includes the search term;
   initiating a search of remote messages stored in a message server using the search term to identify ones of the remote messages that includes the search term;
   determining if any of the ones of the local messages matches any of the ones of the remote messages by comparing a message identifier of the ones of the local messages to a message identifier of the ones of the remote messages;
   for each of the ones of the remote messages that matches one of the local messages, comparing a size of the local message to a size of the matching remote message, selecting the local message for presentation at the wireless handheld device in response to determining that the size of the local message is greater than the size of the matching remote message, and selecting the matching remote message for presentation in response to determining that the size of the local message is less than the size of the matching remote message.

2. The method of claim 1, comprising presenting each local message that is selected and each remote message that is selected in a combined list.

3. The method of claim 2, comprising identifying each remote message in the combined list using a remote message identifier.

4. The method of claim 1, comprising presenting the selected local messages and the selected remote messages in separate lists.

5. The method of claim 1, wherein conducting the search of the local messages and initiating the search of the remote messages occurs concurrently.

6. The method of claim 1, comprising
in response to selecting the remote message for presentation, displaying available content from the local message, retrieving content of the matching remote message from the message server that is unavailable from the local message, and displaying the content of the matching remote message.

7. A wireless handheld device comprising:
a display;
a memory;
a processor connected to the display and the memory for execution of a messaging application to conduct a search of local messages stored in the memory using a search term to obtain ones of the local messages that contains the search term, to initiate a search of remote messages stored in a message server to obtain ones of the remote message that include the search term and retrieve each remote message that contains the at least one search term from the message server, determine if any ones of the remote messages matches any of the ones of the local messages by comparing a message identifier of the ones of the local messages to a message identifier of the ones of the remote messages; and for each of the ones of the remote messages that matches one of the local messages, compare a size of the local message to a size of the matching remote message, select the local message for presentation at the wireless handheld device in response to the size of the local message being greater than the size of the matching remote message, and select the matching remote message for presentation at the wireless handheld device in response to the size of the local message being less than the size of the matching remote message.

8. The wireless handheld device of claim 7, wherein the messaging application is adapted to present each local message that is selected and each remote message that is selected on the display in a combined list.

9. The wireless handheld device of claim 8, wherein the messaging application is adapted to identify each remote message in the combined list using a remote message identifier.

10. The wireless handheld device of claim 7, wherein messaging application is adapted to present each local message that is selected and each remote message that is selected in separate lists.

11. The wireless handheld device of claim 7, wherein the messaging application is adapted to conduct the search of the local messages and to initiate the search of remote messages concurrently.

12. The wireless handheld device of claim 7, wherein, if the remote message is selected for presentation, the content from the local message is displayed, the content of the remote message from the message server that is unavailable from the local message is retrieved, and the content of the remote message is displayed.

13. A data processor readable medium storing data processor code that when loaded into a wireless handheld device adapts the device to present message search results, the data processor readable medium comprising:
code configured to conduct a search of local messages stored in the wireless handheld device using a search term to obtain ones of local messages that include the search term;
code configured to initiate a search of remove messages stored in a message server using the search term;
code configured to determine if any ones of the remove messages matches any ones of the local messages by comparing a message identifier of the local message to a message identifier of the remote message;
for each of the ones of the remote messages that matches one of the local messages, compare a size of the local message to a size of the matching remote message, select the local message for presentation at the wireless handheld device in response to determining that the size of the local message is greater than the size of the matching remote message, and select the matching remote message for presentation at the wireless handheld device in response to determining that the size of the local message is less than the size of the matching remote message;
wherein the data processor readable medium is non-transitory.

14. The data processor readable medium of claim 13, comprising code configured to present each local message that is selected and each remote message that is selected in a combined list.

15. The data processor readable medium of claim 14, comprising code configured to identify each remote message in the combined list using a remote message identifier.

16. The data processor readable medium of claim 13, comprising code configured to present the selected local message and the selected remote message in separate lists.

17. The data processor readable medium of claim 13, comprising code configured to conduct the search of the local message and initiate the search of remote searches concurrently.

* * * * *